June 4, 1935. A. S. MITCHELL 2,003,897
UPHOLSTERY MACHINE
Filed Feb. 19, 1930 5 Sheets-Sheet 1
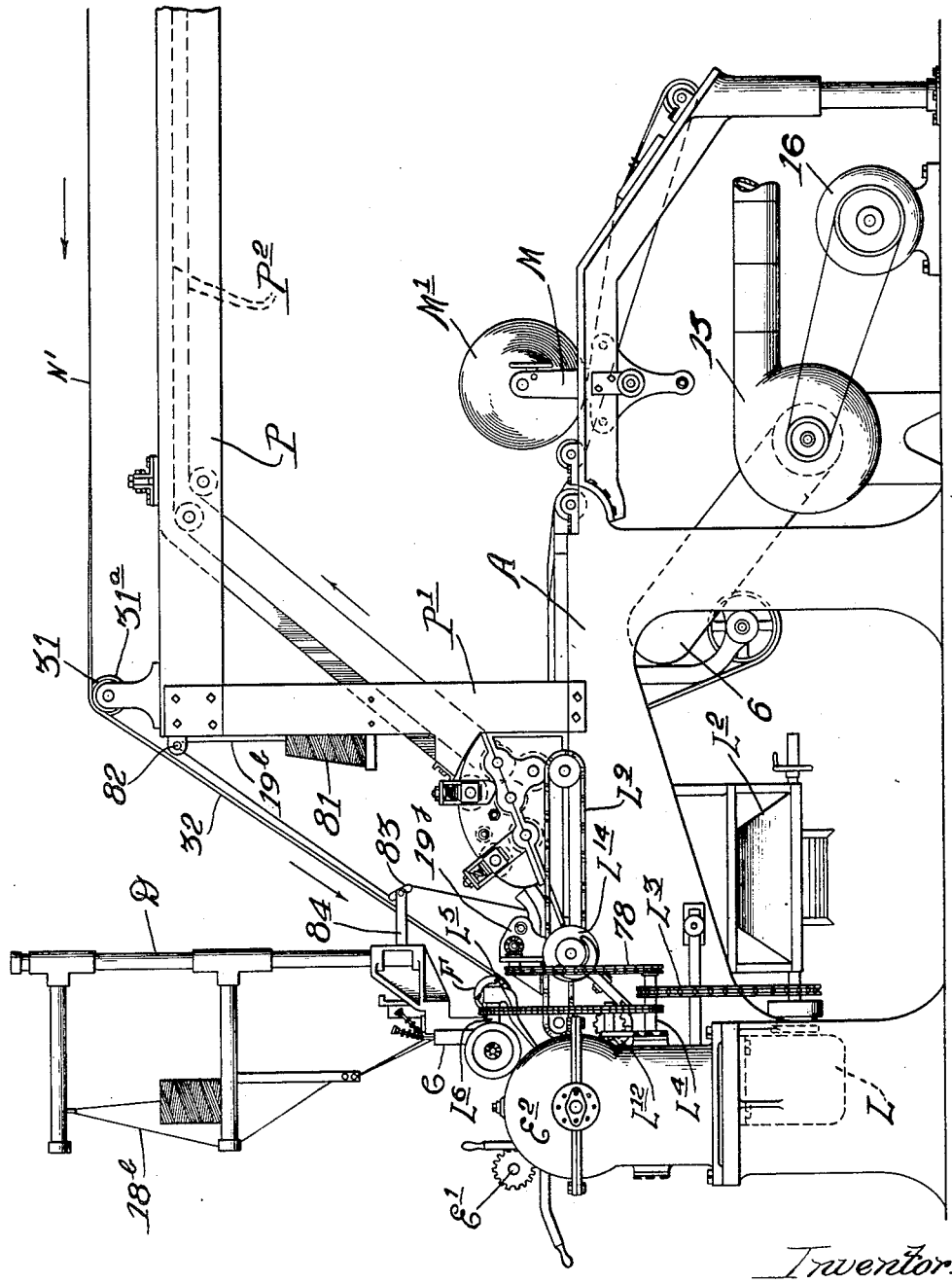

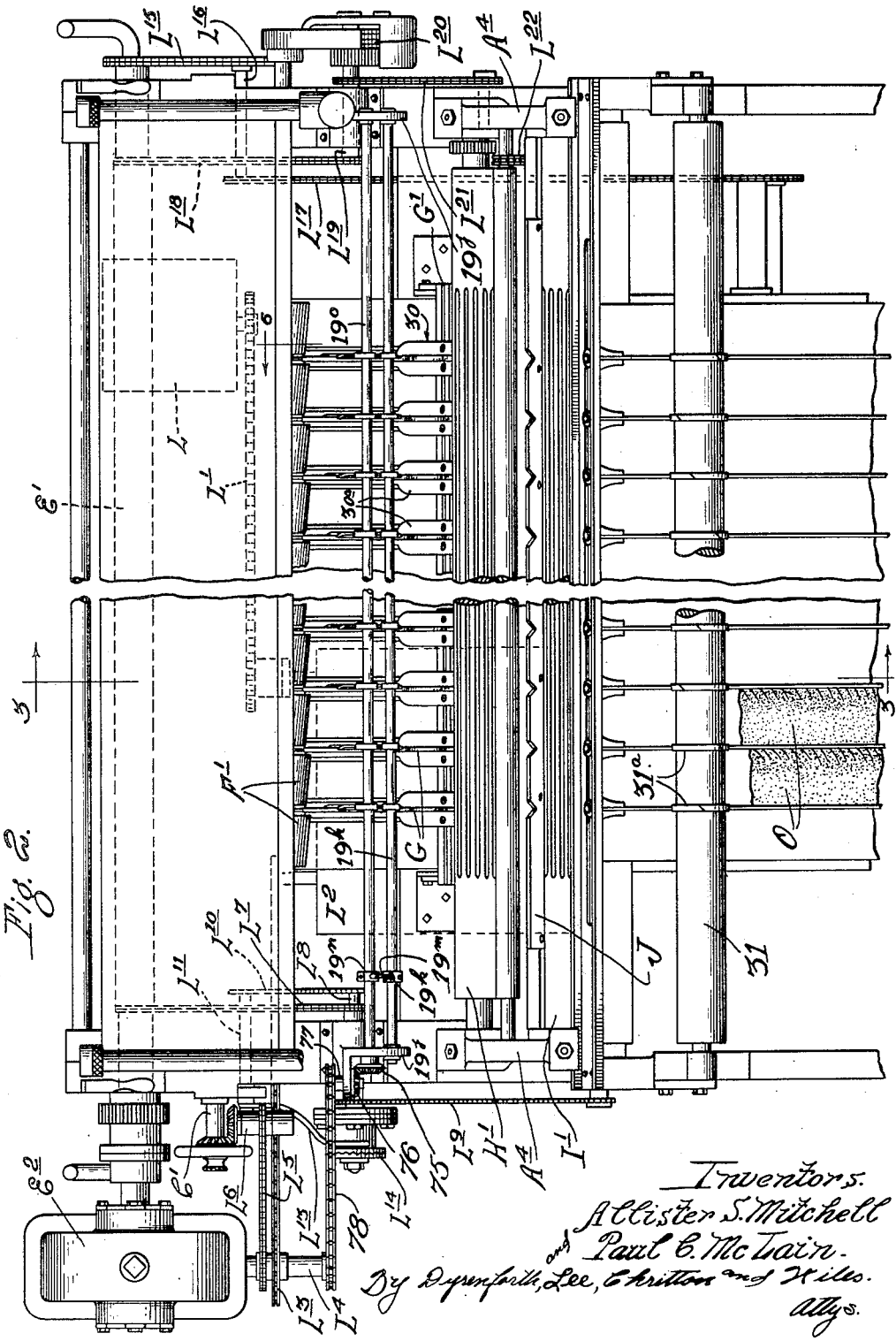

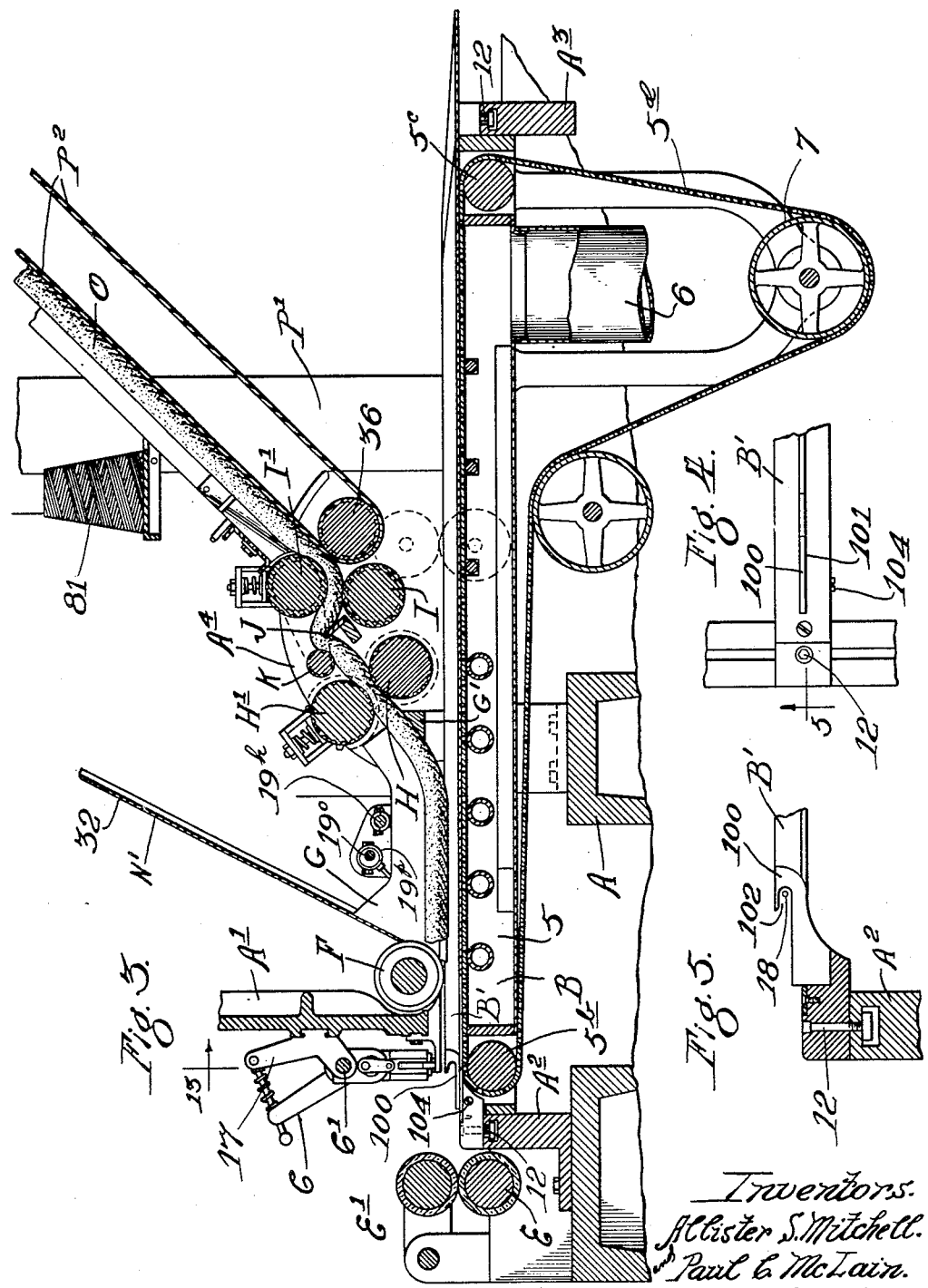

June 4, 1935.  A. S. MITCHELL  2,003,897
UPHOLSTERY MACHINE
Filed Feb. 19, 1930    5 Sheets-Sheet 4
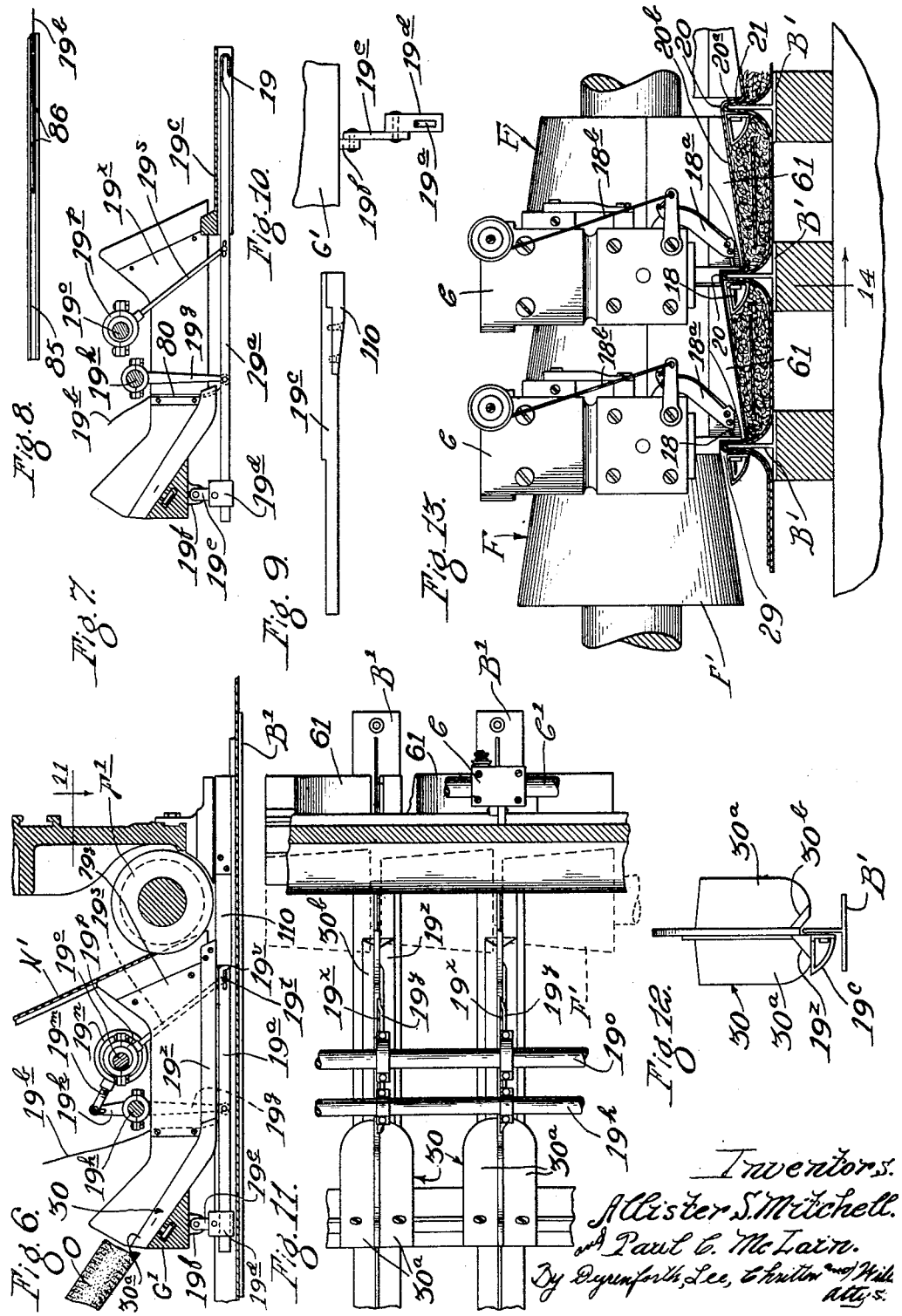

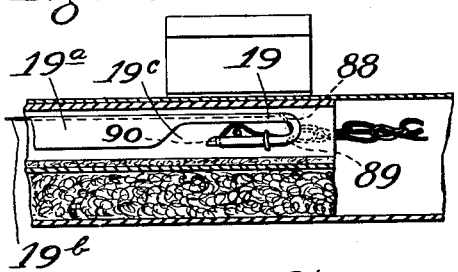
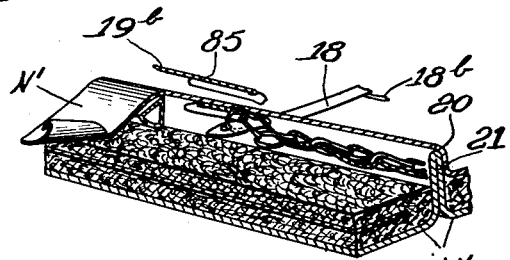
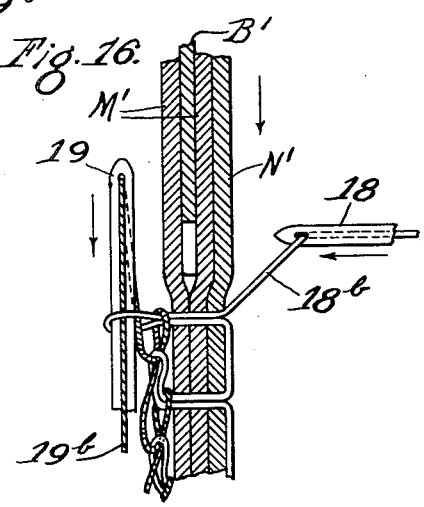
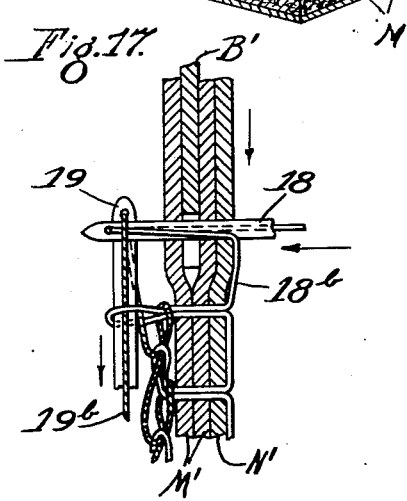
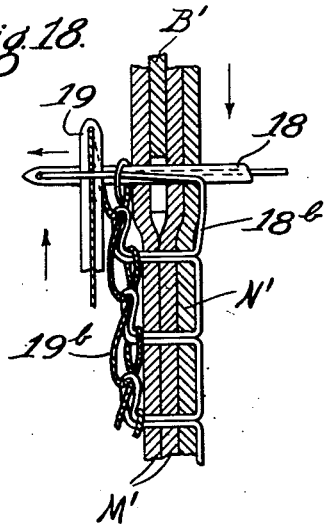
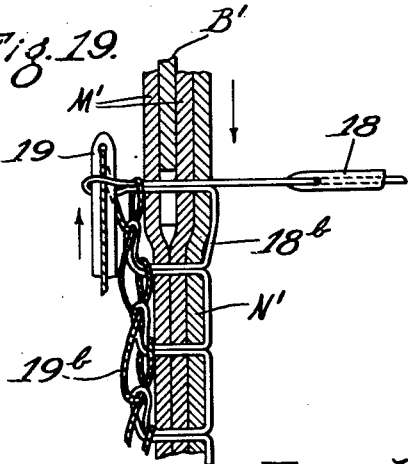

Patented June 4, 1935

2,003,897

UNITED STATES PATENT OFFICE 2,003,897

UPHOLSTERY MACHINE

Allister S. Mitchell, Detroit, Mich., assignor to National Automotive Fibres, Inc., Oakland, Calif., a corporation of Delaware Application February 19, 1930, Serial No. 429,708

15 Claims. (Cl. 112—2)

This invention relates to a machine and a method for manufacturing upholstery, and is more particularly concerned with a novel method and novel mechanism for forming the seams of multi-pleat upholstery.

The primary object is to provide an improved machine and an improved method which will facilitate the formation of seams in stuffed, multi-pleat, or pleated, upholstery. Upholstery of the kind described usually comprises a main or cover fabric, and a lining fabric united by parallel seams and divided thereby into pleat-fullnesses which are stuffed with batts.

The improved method for manufacturing upholstery of the kind described is preferably practiced by employing a machine which embodies one form of the invention and comprises a frame having a vertically adjustable cross-head which carries a series of horizontally adjustable sewing-heads equipped with sewing-needles; looper-bars which cooperate with the sewing-needles to form chain-stitch seams in nested seam-ridges, formed in the main, or cover, and lining fabrics of the upholstery, the stitches passing through two thicknesses of one fabric and through a single thickness of the other; mechanism for feeding the main, or cover, and lining fabrics continuously through the machine; mechanism for advancing cotton-batts through the machine between the cover and lining fabrics, the feeding means for the batts being stopped at intervals to space the batts between adjacent sections of the upholstery which are to be severed from each other; pneumatic means coacting with ridge-bars for forming the seam-ridges and intervening depressed pleats, or pipes, in the cover fabric; means including creaser-bars for forming the seam-ridges in the lining fabric, and driving means whereby a cyclic operation of the machine is obtained.

The sewing-heads of the machine, which is illustrated in the accompanying drawings and embodies the present invention, are not provided with looper-needles in accordance with the construction employed in copending applications of Allister S. Mitchell, Serial Nos. 347,935 and 427,205, filed March 18, 1929, and Feb. 10, 1930 respectively. Instead, there are provided looper-bars, or needles, actuated and supported by mechanism which is disposed between the paths along which the lining fabric and the batts are advanced to the sewing-heads, housing members being provided for the looper-bars and arranged so that they provide spaces between the batts and the lining fabric wherein the looper-bars travel in substantially elliptical paths and cooperate with the sewing-needles. The housing members for the looper-bars are carried by the lining-creasers and their upper surfaces guide portions of the lining-fabric in such manner that a single thickness thereof is united with two thicknesses of the cover fabric at each seam.

The forward ends of the ridge-bars for forming the ridge-seams in the cover fabric are preferably provided with tips which are readily replaceable in the event they are broken or deformed during the operation of the machine.

The invention is illustrated in a preferred embodiment in the accompanying drawings in which:—

Fig. 1 is a side elevation of an upholstery-making machine embodying the invention; Fig. 2 is an enlarged fragmentary plan view of the machine; Fig. 3, a fragmentary sectional view taken as indicated at a line 3 on Fig. 2; Fig. 4, an enlarged fragmentary plan view of the forward end of one of the ridge-bars provided for forming the seam-ridges in the cover fabric; Fig. 5, a fragmentary section taken as indicated at line 5 on Fig. 4; Fig. 6, a fragmentary sectional view taken as indicated at line 6 of Fig. 2, illustrating the arrangement of the lining-creasers, the looper-bars and their housings, and the means for actuating the looper-bars; Fig. 7, a broken sectional view taken substantially on the same line as Fig. 6, the looper-bar housing being shown in section and a cover-plate for the looper-bar actuating means being removed; Fig. 8, a fragmentary plan elevation of one of the looper-bars; Fig. 9, a plan view of one of the housing members provided for the looper-bars; Fig. 10, a fragmentary rear view of the mechanism shown in Fig. 8; Fig. 11, a fragmentary plan section taken as indicated at line 11 of Fig. 6, certain forming-rolls having been omitted from Fig. 11 to permit better illustration of the lining-creasers and the ridge-bars; Fig. 12, a front elevation of a lining-creaser, a ridge-bar, a looper-bar and a looper-bar housing; Fig. 13, a fragmentary section taken as indicated at line 13 of Fig. 3, illustrating the construction of the sewing-heads and the manner in which the sewing operations are performed, a cross-bar supporting the sewing-heads having been omitted to permit illustration of forming rolls which engage the outer surface of the lining fabric; Fig. 14, a fragmentary section taken as indicated at line 14 on Fig. 13 and illustrating the manner in which the looper-bars cooperate with the sewing-needles; Fig. 15, a perspective view (partly broken away) of a ridge-seam and the pleat fullnesses or outer side of it, the looper-bar and sewing-needle being shown to illustrate the manner in which they cooperate to secure, or unite, one thickness of the lining fabric with two thicknesses of the cover fabric; and Figs. 16–19, diagrammatic horizontal sectional views illustrating the sewing operation.

While the invention has been illustrated in connection with a machine comprising certain features as pneumatic means, etc. for forming the ridge-seams in the lining and main, or cover, fabrics, it is to be understood that the invention is limited to such features only to the extent indicated in the appended claims.

In the embodiment selected for illustrating the invention, A designates the main frame of the machine which is equipped near its front end with a vertically adjustable cross-head A', the frame being provided (Fig. 3) with members $A^2$ and $A^3$; B, a suction conveyor device mounted in the bed of the machine and adjustably supported on the cross-members $A^2$ and $A^3$, said conveyor having associated therewith ridge-bars B' which serve to produce seam-ridges in the main fabric; C, a series of sewing mechanisms mounted on the cross-head A' and laterally adjustable thereon to enable the width of the pleats to be varied, the sewing mechanisms being actuated by a common shaft C'; D, a thread-supporting device carried by the cross-head A'; E, E', a pair of front feed-rolls through which the upholstery is delivered from the machine, these rolls being actuated through the medium of change-speed gear mechanism $E^2$; F, a forming-roll disposed back of and carried by the lower portion of the adjustable cross-head A', said forming-roll comprising longitudinally adjustable frustro-conical rollers or collars F' forming grooves through which the ridge-bars B' extend; G, a series of lining-creasers adjustably mounted on a transverse bar G' carried by the bed; H, H', a main pair of batt-feeding rolls journaled in supports $A^4$ carried by the bed; I, I', an auxiliary pair of batt-feeding rolls journaled in the members $A^4$, these auxiliary rolls being periodically arrested to cause severance of the batts; J, a shearing device upon which the batts are severed when the rolls I and I' are stopped; K, a deflector roll whose function is to direct the batts between the rolls H and H' when the feed of the auxiliary rolls is resumed; L (Figs. 1 and 2) an electric motor which actuates, through the medium of a chain or belt L', gear mechanism $L^2$ of well-known construction; $L^3$ a chain driven from the gear mechanism $L^2$ and serving to actuate a shaft $L^4$ which forms part of the gear mechanism $E^2$; $L^5$ a chain connecting the shaft $L^4$ with a short parallel shaft $L^6$, which, as more fully illustrated and described in the co-pending application, Serial No. 427,205, filed Feb. 10, 1930 serves to actuate the shaft C' associated with the sewing mechanisms; $L^7$ (Fig. 2) a chain driven from the lower feed-roll E and serving to actuate a shaft $L^8$ which actuates a chain $L^9$ which operates the auxiliary batt-feeding rolls and the batt conveyor; $L^{10}$, a chain driven by the shaft $L^8$ which actuates a cam-shaft $L^{11}$ equipped with a cam $L^{12}$ controlling a clutch member $L^{13}$, the clutch member $L^{13}$ being arranged to periodically operate a clutch $L^{14}$ to control the driving of the chain $L^9$ from the shaft $L^8$ so that the auxiliary batt-feeding rolls I and I' are periodically stopped to cause severance of the batts; $L^{15}$ (Fig. 2), a chain driven by the front feed-roll E to actuate a shaft $L^{16}$ which drives a chain $L^{17}$ which actuates the suction conveyor; $L^{18}$, a chain driven by the roll E to drive a shaft $L^{19}$ from which motion is communicated through a gear device $L^{20}$ to the forming-roll F; $L^{21}$, a chain driven by the shaft $L^{19}$ to actuate the main batt-feeding rolls H and H'; $L^{22}$, a chain serving to drive the deflector shaft K from the auxiliary batt-feeding roll I'; M, supporting means for a main cover, or finish, fabric, mounted on the main frame and carrying a roll of cloth M', from which a supply is led over the suction conveyor B to ride on the ridge-bars B'; N', lining fabric being led forwardly in the manner shown in Fig. 1; O, the strips of batting being led forwardly over a conveyor; P, a conveyor frame having its front portion supported on standards P' mounted on the bed of the machine; $P^2$, an endless conveyor which carries the batts to the auxiliary-feed rolls I and I'.

The above described chains and shafts driven by the electric motor L, together with the cam $L^{12}$ and the clutch $L^{14}$, are substantially identical in arrangement and construction and have the same functions as similar parts shown and described in copending application, Serial No. 427,205, filed Feb. 10, 1930, and, therefore, the functions thereof need not be described in detail in this application. Thus, the shaft C' which actuates the sewing mechanisms C is driven from the shaft $L^6$ through the medium of other shafts (not shown) operatively connected to the shaft $L^6$ and the shaft C' and gearing identical with that shown and described in the last mentioned copending application is provided intermediate the chain $L^9$, and the roll I and a roll 36 which form part of the batt conveyor $P^2$ and actuates it.

However, the function of the shaft C' differs somewhat from the function of the corresponding shaft shown and described in the last mentioned copending application, as in the present invention the sewing mechanisms C do not include looper-needles and means for actuating them, although in all other respects the sewing mechanisms C are preferably identical in construction and operation with similar mechanisms shown and described in the last mentioned copending application.

It may be mentioned that the sewing mechanisms C are pivotally suspended from brackets 17 which are adjustably mounted on the cross-head A' and that the actuating shaft C' is also journaled in said brackets. The sewing needles are designated 18. They are actuated by levers 18ª which swing in a transverse plane. The sewing thread is designated 18ᵇ.

In machines embodying the present invention, the looper-needles are preferably supported and operated independently of the sewing-mechanisms C, although they are actuated in synchronism. The looper-needle associated with each sewing-head is designated 19 and is preferably formed integral or attached to a looper-bar 19ª disposed within a housing member 19ᶜ. The looper-needle thread is designated 19ᵇ.

As best shown in Figs. 2, 6 and 7, the housing members 19ᶜ are preferably formed integral with, or rigidly secured to the lining-creasers G, and each looper-bar 19ª has its back end slidably journaled in a block 19ᵈ connected by a link 19e to a lug 19f depending from the transverse bar G'. A lever 19g is provided for each looper-bar 19a and one end thereof is pivotally connected to the looper-bar, the lever 19g being fixed to a shaft 19h extending transversely and positioned above the lining-creasers G. The shaft 19h has its ends journaled in brackets 19j mounted on the frame A and is provided with a lever 19k operatively connected by an adjustable arm 19m with an eccentric 19n actuated by a shaft 19o extending parallel to the shaft 19h and journaled in the brackets 19j. Obviously, when the shaft 19o is rotated, the eccentric 19n will oscillate the shaft 19h to reciprocate the looper-bars 19a through the medium of the levers 19g.

19p designates a series of eccentrics mounted upon and actuated by the shaft 19o, each eccentric 19p being operatively connected with a looper-bar 19a by an arm 19s. Each arm 19s is provided with a pin 19t engaging a slot 19v in the associated looper-bar. The arrangement is such that when the shaft 19o is rotated, the looper-bars 19a will be actuated in such manner that the looper-needles 19 will travel in substantially elliptical paths.

It will be noted that the shafts 19h and 19o are positioned intermediate the paths along which the lining fabric and the cotton-batts travel to the sewing mechanisms C.

The lever 19g and the arm 19s project through relatively wide shallow grooves 19x formed in side surfaces of the lining-creasers G, the grooves 19x being provided with cover-plates 19y (see Figs. 6 and 7).

The means for actuating the shaft 19o comprises a bevel gear 75 fixed to one end of the shaft; 76, a bevel gear which is actuated by a shaft 77 journaled in one of the brackets 19j, and 78, a chain actuating the shaft 77 and actuated by the shaft L4 (see Figs. 1 and 2).

As the fabrics move through the machine, the lining fabric N' has formed therein seam-ridges 20 (see Figs. 13 and 15), and the main fabric M' has formed therein U-shape seam-ridges 21 which become nested with the seam-ridges 20. Each seam ridge 20 formed in the lining fabric N' comprises a substantially flat seam portion 20a positioned adjacent and in contact with one wall or leg of the associated seam-ridge 21, formed in the main fabric M'. The sections or pleats of the lining fabric N' that lie between the seam portions 20a are designated 20b and are held at an angle to the main fabric M' during the sewing operation. As best shown in Fig. 13, each section 20b extends from the upper edge of a seam portion 20a to the bottom edge of the adjacent seam portion 20a. The lining fabric N' is shaped in this manner by the forming-roll F and by laterally adjustable shoes 61 carried by the cross-head A'. When the lining fabric N' is disposed in this manner with respect to the main fabric M', it is obvious that the sewing-needles 18 will each pass through a single thickness of the lining fabric and through two thicknesses of the main fabric. As shown, the forward ends of the housing members 19c are substantially triangular in cross-section and are arranged in such manner that they hold the cotton-batts spaced from the seam-ridges and provide spaces wherein the sewing-needles 18 may cooperate with the looper-needles 19 without becoming entangled with the batts, a wall of each housing member being apertured to permit passage of the associated sewing-needle therethrough.

In the sewing operation, each sewing-needle and its associated looper-needle cooperates to produce a double thread chain-stitch, which is familiarly known in the trade as a "chainlock stitch". This stitch and the manner in which it is formed by a sewing-needle and its associated looper-needle 19 are illustrated in Figs. 7, 14-19.

The looper-thread 19b advances to the looper-needle through a groove 80 provided in the associated lining-creaser G, the looper-thread being withdrawn from a spool 81 mounted on the conveyor frame P and being drawn over a pin 82 also mounted on the conveyor frame P and through a tension device 83 mounted in arms 84 carried by the sewing-thread supporting device D (see Fig. 1). From the groove 80, the looper-thread passes through a groove 85 cut in the upper surface of the looper-bar, the thread being retained in the groove by pins 86 (see Fig. 9) extending transversely of the groove. From the groove 85, the looper-thread passes through holes 88 and 89 drilled in the forward end of the looper-bar and then through a hole 90 drilled in the forward end of the looper-needle (see Fig. 14). The looper-needle 19 is formed by providing a U-shaped end at the forward end of the looper-bar, the construction being such that the forward end of the looper-needle points in the opposite direction to that in which the forward end of the looper-bar points.

The sewing-thread 18b is preferably advanced to the sewing-needle 18 in the same manner as it is advanced to the corresponding sewing-needle shown and described in the last-mentioned copending application, the sewing-thread being trained through a hole drilled in the forward end of the sewing needle.

In Figs. 15-19, the sewing-thread 18b is shown in light lines and the looper-thread 19b is shown in heavy lines. In Fig. 16, the looper-needle 19 is shown near the end of its forward thrust but is retracted therefrom as indicated by the arrow, and it will be observed that the sewing-needle 18 is about to pass through the ridge-seam which comprises one thickness of the lining fabric N' and two thicknesses of the main fabric M', the thickness of that seam portion previously designated as 20a.

Fig. 17 shows the sewing-needle 18 passing over the forward end of the looper-needle 19 but under the looper-thread 19b disposed above the looper-needle.

Fig. 18 shows the looper-needle 19 advancing in its forward thrust and the sewing-needle 18 passing beneath the looper-needle, the looper-needle being disposed between the sewing-needle and that portion of the sewing-thread 18b which passes above the sewing-needle. On this forward thrust, the looper-needle carries its loop through the sewing thread loop.

Fig. 19 shows the sewing-needle 18 withdrawn and the looper-needle advancing to bring the looper thread loop again to the position shown in Fig. 16.

From the description given, it will be understood that the invention provides for the catching and positive withholding of the looper-thread loop so as to insure the passing of the sewing-needle through the looper-thread loop at every thrust of the sewing-needle.

The mechanism in advance of the lining-creasers G for advancing the lining and main fabrics, and the cotton-batts, and the mechanism in advance of the lining creasers G⁴ for forming seam-ridges and intervening pleat-fullnesses in the main, or cover, fabric are substantially identical with similar mechanisms shown and described in the last-mentioned copending application and need not be described in detail.

The lining creasers G, the forming roll F and the forward ends of the ridge-bars B' are of different construction and must be described in more detail.

The suction conveyor B (Fig. 3) comprises a hollow rectangular frame 5 which is open at its top and is connected to an exhaust pipe 6; 5ᵈ a foraminous belt which passes about rollers 5ᵇ and 5ᶜ journaled in the frame, the belt being arranged to travel over the open top of the frame; and 7, a roller which drives the belt 5ᵈ and is actuated through the medium of the sprocket chain L¹⁷.

The suction pipe 6 connects with the intake portion of a fan or blower 15 operated by an independent motor 16 (Fig. 1).

The ridge-bars B' have their ends connected with the cross-bars A² and A³ by means of bolts 12 adjustably connected with T-slots with which the upper edge portions of the cross-members are provided. This permits the bars to be adjusted to correspond with the width of the pleats. The ridge-bars extend through the grooves of the forming-roll F in a manner which will be best understood from Fig. 13. The ridge-bars also extend through grooves formed between the adjustable shoes 61 carried by the cross-head A'. At their forward ends, the ridge-bars B' are provided with replaceable tips 100 which fit in slots 101 cut through the ridge-bars (see Figs. 4 and 5), the tips 100 having notches 102 through which the sewing-needles 18 travel. The ridge-bars B' are preferably T-shaped in cross-section and their forward ends are connected for lateral adjustment upon the cross-bar A². Screws 104, provide means for rigidly securing the tips 100 in the slots 101 (see Fig. 3). This construction is advantageous as it permits the tips to be readily replaced if they are broken or deformed during the operation of the machine.

The lining creasers G are disposed over the ridge-bars B' and are provided with Y-shaped portions 30 at their back ends, which portions 30 have upper inclined surfaces 30ᵃ for guiding the edges of the batts onto inclined surfaces 19ˣ formed upon the housing members 19ᶜ and upon inclined surfaces 30ᵇ formed on the sides of the lining-creasers G opposite to the sides thereof to which the housing members 19ᶜ are secured (see Figs. 6 and 7). These surfaces 19ˣ and 30ᵇ serve to properly guide the batts as they approach the forming-roll F. The lining-creasers extend into the grooves 29 of the forming-roll, the grooves 29 being formed by the frustro-conical rollers F''.

The lining fabric N' passes to the forming-roll F from the roller 31 mounted at the front end of the frame P. This roller is provided with spaced rollers or collars 31ᵃ which serve to produce seam-ridges 32 in the lining-fabric. These fullnesses, or shallow seam-ridges persist in the fabric, more or less, until the lining-creasers G engage them, and at this point the seam-ridges 32 ride over the bevels 30ᵃ of these lining-creasers and are guided into the grooves 29 of the forming-roll in such manner as to be in position to receive the seam-ridges of the finish fabric M'.

In Figs. 1, 3, 6 and 7, the cross-head A', the forming-roll F and the sewing-heads C are shown raised above their normal positions so that the forward ends of the ridge-bars B' do not pass through the grooves 29 provided between the frustro-conical rollers F'' and do not pass through grooves or notches 61ᵃ provided between the adjustable shoes 61. This is merely for the purpose of better illustration.

Fig. 13 illustrates the forming-roll F, the sewing-heads C and the shoes 61 in their functionally operative positions with respect to the ridge-bars B'. When the forming-roll F is in its functionally operative position with respect to the ridge-bars B', each of the rollers F'' depresses the batt passing underneath it so that one edge of the batt is urged downward to engage a cam surface 110 provided upon the associated housing member 19ᶜ and is further depressed thereby so that it will ride along the lower surface of the housing member (see Figs. 6, 9 and 13). The remaining portion of the top surface of each batt is held depressed between the ridge-bars B' by the associated roller F', and the associated shoe 61 which has an inclined lower surface conforming to the taper of the roller F'.

The operation of the machine may be described briefly: Assuming a partial vacuum obtains in the suction conveyor through the action of the blower 15, this conveyor operates to feed the main, or cover, fabric through the machine and form it into seam-portions and intervening pleat-fullnesses, the main, or cover, fabric being properly gathered and shaped over the ridge-bars B' by the suction exerted through the belt 5ᵃ. The batts are carried by the batt-conveyor P² to the auxiliary batt-feeding-rolls I and I', from which the batts pass over the shearing device J and thence through the main batt-feeding rolls H and H'. The lining fabric N' passes over the roll 31 provided with the spaced collars 31ᵃ, which collars may be adjusted to correspond with the spaces between the seam-ridges. The lining fabric has the seam-ridges 32 preparatorily formed therein in passing over the spaced collars 31ᵃ. These seam-ridges persist, more or less, until they encounter the creasers G which direct them properly into the grooves of the forming-rolls F. In passing between the forming-roll and the pneumatic conveyor, the seam-ridges of the two fabrics become properly nested and the batts become properly positioned in the pleats as they are formed. The seams pass underneath the sewing-mechanisms, each of which operates in such manner that a single thickness of the lining-fabric is sewed to two thicknesses of the main, or cover, fabric. The upholstery then passes on through the front feed-rolls E and E', which are preferably geared to speed slightly faster than the other feed-devices. The batts are severed at intervals by the severing device J in a manner more fully described in the last mentioned copending application, so that the lining and cover fabrics may be subsequently severed at the same points to divide the upholstery into units.

What I regard as new, and desire to secure by Letters Patent, is:

1. In an upholstery machine: means for feeding fabric and forming seam-portions and intervening pleat-fullnesses, the seam-portions of one fabric being of U-form; and sewing mechanisms adapted to unite the seam-portions, each sewing mechanism comprising a transversely reciprocating sewing-needle working through one thickness solely of one fabric at its seam-portion and through two thicknesses of the other fabric at its seam-portion, and a looper needle working in the space between the superposed fabrics and co-acting with said sewing needle.

2. In a machine of the character set forth: means for feeding fabrics; means for subjecting one of said fabrics to fluid pressure to form seam-portions and intervening pleat-fullnesses therein; sewing mechanism including a sewing-needle working through one thickness solely of one of said fabrics and through two thicknesses of the other, and a looper-needle working between the fabrics and co-acting with said sewing-needle.

3. In a machine of the character set forth: means for feeding fabrics and forming seam-portions and intervening pleat-fullnesses, the seam-portion of one fabric being of U-form; sewing mechanisms adapted to unite said seam-portions, each sewing mechanism comprising a transversely reciprocating sewing-needle working through more thicknesses of one fabric than of the other, said needle working through the U-form seam-portion; and a looper-needle working between the superposed fabrics and co-acting with each of said sewing-needles.

4. In a machine of the character set forth: means for feeding fabrics and forming seam-portions and intervening pleat-fullnesses, the seam-portions of one fabric being U-form; sewing mechanisms for uniting the seam-portions, each sewing mechanism comprising a transversely reciprocating sewing needle working through a U-form seam-portion in one fabric and a single thickness of the other fabric, and looper-bars operating in the space between the superposed fabrics and equipped with backwardly extending looper-needles coacting with said sewing needles.

5. In a machine of the character set forth: means for feeding fabrics and forming seam-portions and intervening pleat-fullnesses, the seam-portions of one fabric being of U-form; sewing mechanisms for uniting said seam-portions, each sewing mechanism comprising a sewing-needle working through said fabrics, said sewing-needle being mounted to reciprocate in a plane extending transversely of said U-form seam-portions; housing members disposed between the superposed fabrics and over which one of said fabrics is advanced; and looper-needles working in said housing members and coacting with said sewing-needles.

6. In a machine of the character set forth: means for advancing fabrics along converging paths and for forming seam-portions and intervening pleat-fullnesses; sewing mechanisms for uniting said seam-portions, each sewing mechanism comprising a sewing-needle working through said fabrics; looper-needles working in the space between said fabrics and coacting with said sewing needles; and mechanism disposed between said converging paths for actuating the looper-needles.

7. In a machine of the character set forth: means for advancing a fabric and for forming seam-portions and intervening pleat-fullnesses therein; means for advancing a second fabric in a path converging with the path through which the first-mentioned fabric is advanced; means for advancing batts in a path intermediate the paths along which said fabrics are advanced; sewing mechanisms for uniting said fabrics, each sewing mechanism comprising a sewing-needle working through said fabrics; looper-needles disposed between said fabrics and coacting with said sewing-needles; and means disposed between the path of said batts and the path of one of said fabrics for actuating said looper-needles.

8. In a machine of the character set forth: means for advancing fabrics and forming seam-portions and intervening pleat-fullnesses, means for advancing batts intermediate the fabrics, sewing mechanism for uniting the fabrics, each sewing mechanism comprising a sewing-needle working through the fabrics; looper-bars having looper-needles disposed between the fabrics and coacting with said sewing-needles; a shaft extending transversely to the paths through which the fabrics are advanced; a second shaft parallel to the first-mentioned shaft; an eccentric on said second shaft for oscillating the first mentioned shaft, means actuated by the first-mentioned shaft for reciprocating said looper-bars; means actuated by the second shaft for swinging said looper-bars to raise and lower said looper-needles, and means for rotating said second shaft.

9. In an upholstery machine: means for feeding a plurality of fabrics and continuously and simultaneously forming longitudinally extending seam-portions and intervening pleat-fullnesses therein, the seam-portions of one fabric being of U-form; and sewing mechanisms adapted to unite the seam-portions of one fabric with those of the other, each sewing mechanism comprising a sewing needle reciprocating transversely of said fabrics to sew through both thicknesses of one of said U-form seam-portions and through a single thickness of the other fabric at its corresponding seam-portion, and a looper-needle working in the space between the superposed fabrics and co-acting with said sewing needle.

10. In a machine of the character set forth: means for advancing a plurality of fabrics, means for subjecting one of said fabrics to fluid pressure to form U-shaped seam-portions and intervening pleat-fullnesses therein; and means for sewing the two thicknesses of each of said U-shaped seam-portions to a single thickness of the other fabric.

11. In a machine of the character set forth: means for advancing a fabric and for forming U-shaped seam portions and intervening pleat-fullnesses therein; means for advancing a second fabric in a path converging with the path through which the first mentioned fabric is advanced; means for advancing batts in a path intermediate the paths along which said fabrics are advanced; sewing machanisms for uniting said fabrics, each sewing mechanism comprising a sewing-needle working through one of said U-shaped seam-portions and through a single thickness of the other fabric; looper-needles disposed between said fabrics and coacting with said sewing-needles; and means disposed between the path of said batts and the path of one of said fabrics for actuating said looper-needles.

12. In a machine of the character set forth: means for advancing fabrics and forming seam-portions and intervening pleat-fullnesses therein, the seam-portions in one fabric being U-form; means for advancing batts intermediate the fabrics; sewing mechanisms for uniting the fabrics, each sewing mechanism comprising a sewing-needle working through both thicknesses of one of said U-form seam-portions and through a single thickness of the other fabric; looper-bars having looper-needles disposed between the fabrics and co-acting with said sewing-needles; a shaft extending transversely of the paths through which the fabrics are advanced; a second shaft parallel to the first-mentioned shaft; an eccentric on said second shaft for oscillating said first-mentioned shaft; means actuated by the first mentioned shaft for reciprocating said looper-bars; means actuated by said second shaft for swinging said looper-bars to raise and lower said looper-needles; and means for rotating said second shaft.

13. In a machine of the character set forth: means for advancing a cover fabric; means for advancing a lining fabric; means for feeding batts between said fabrics; and a plurality of sewing mechanisms for sewing spaced seams in said fabrics extending longitudinally thereof, each sewing mechanism comprising a sewing-needle working through both fabrics, means forming a working space betweeen one of said fabrics and a batt, and a looper-needle operating in said working space and co-operating with said sewing-needle.

14. In a machine of the character described, in combination, mechanism for feeding two sheets of fabric into superimposed relationship and for feeding a plurality of strips of padding material between said sheets, and mechanism including stitch-forming instrumentalities extending between the sheets for sewing said sheets together along parallel lines between said padding strips.

15. In a machine of the character described, in combination, mechanism for feeding two sheets of fabric in superimposed relationship and for feeding parallel strips of padding material between said sheets, means for forming a series of parallel folds in one of said sheets between said padding strips and means including stitch-forming instrumentalities extending between the sheets for sewing said folds to the other sheet.

ALLISTER S. MITCHELL.